US012327929B2

(12) United States Patent
Yang

(10) Patent No.: US 12,327,929 B2
(45) Date of Patent: Jun. 10, 2025

(54) ELECTRONIC DEVICE

(71) Applicant: VIVO MOBILE COMMUNICATION CO., LTD., Dongguan (CN)

(72) Inventor: Kuai Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 147 days.

(21) Appl. No.: 18/094,343

(22) Filed: Jan. 6, 2023

(65) Prior Publication Data

US 2023/0163463 A1 May 25, 2023

Related U.S. Application Data

(63) Continuation of application No. PCT/CN2021/105413, filed on Jul. 9, 2021.

(30) Foreign Application Priority Data

Jul. 9, 2020 (CN) ......................... 202010658881.1

(51) Int. Cl.
*H01Q 5/335* (2015.01)
*H01Q 1/22* (2006.01)
(Continued)

(52) U.S. Cl.
CPC ........... *H01Q 5/335* (2015.01); *H01Q 1/2291* (2013.01); *H01Q 1/243* (2013.01); *H01Q 1/48* (2013.01);
(Continued)

(58) Field of Classification Search
CPC ...... H01Q 1/243; H01Q 1/2291; H01Q 5/335; H01Q 9/42; H01Q 21/28; H01Q 21/30
See application file for complete search history.

(56) References Cited

U.S. PATENT DOCUMENTS

2013/0249744 A1 9/2013 Jang et al.
2019/0181553 A1 6/2019 Lee et al.
(Continued)

FOREIGN PATENT DOCUMENTS

CN 105490004 A 4/2016
CN 107394389 A 11/2017
(Continued)

OTHER PUBLICATIONS

International Search Report issued in corresponding International Application No. PCT/CN2021/105413, mailed Oct. 9, 2021, 4 pages.
(Continued)

*Primary Examiner* — Daniel Munoz
(74) *Attorney, Agent, or Firm* — IPX PLLC

(57) ABSTRACT

An electronic device is provided. The electronic device includes: a first radiator, a second radiator, a first signal source, and a second signal source. The first radiator is coupled to the second radiator, the first signal source is electrically connected to the first radiator, the second signal source is electrically connected to the second radiator, the first signal source is a signal source used when the electronic device works at a positioning frequency band or works at a first WiFi frequency band, and the second signal source is a signal source used when the electronic device works at a second WiFi frequency band.

9 Claims, 5 Drawing Sheets

(51) Int. Cl.

| | |
|---|---|
| ***H01Q 1/24*** | (2006.01) |
| ***H01Q 1/48*** | (2006.01) |
| ***H01Q 5/50*** | (2015.01) |
| ***H01Q 9/42*** | (2006.01) |
| ***H01Q 21/30*** | (2006.01) |

(52) U.S. Cl.
CPC ................. *H01Q 5/50* (2015.01); *H01Q 9/42* (2013.01); *H01Q 21/30* (2013.01)

(56) References Cited

U.S. PATENT DOCUMENTS

| | | | | |
|---|---|---|---|---|
| 2022/0140471 A1* | 5/2022 | Sun | .......................... | H01Q 5/50 343/702 |
| 2022/0328961 A1* | 10/2022 | Wu | ........................ | H01Q 1/243 |

FOREIGN PATENT DOCUMENTS

| | | | |
|---|---|---|---|
| CN | 108470977 | A | 8/2018 |
| CN | 108631041 | A | 10/2018 |
| CN | 109119747 | A | 1/2019 |
| CN | 109546311 | A | 3/2019 |
| CN | 208589536 | A | 3/2019 |
| CN | 107039766 | B | 7/2019 |
| CN | 108736130 | B | 1/2020 |
| CN | 110931956 | A | 3/2020 |
| CN | 111129768 | A | 5/2020 |
| CN | 111769357 | A | 10/2020 |
| EP | 2725656 | A1 | 4/2014 |
| WO | 2020119366 | A1 | 6/2020 |

OTHER PUBLICATIONS

First Office Action issued in related Chinese Application No. 202010658881.1, mailed May 7, 2022, 7 pages.
Extended European Search Report issued in related European Application No. 21837966.7, mailed Nov. 8, 2023, 7 pages.

* cited by examiner

ELECTRONIC DEVICE

CROSS-REFERENCE TO RELATED APPLICATIONS

This application is a continuation of International Application No. PCT/CN2021/105413, filed Jul. 9, 2021, which claims priority to Chinese Patent Application No. 202010658881.1, filed Jul. 9, 2020. The entire contents of each of the above-referenced applications are expressly incorporated herein by reference.

TECHNICAL FIELD

This application pertains to the field of communications technologies, and in particular, to an electronic device.

BACKGROUND

With the development of electronic technologies, people have increasingly higher requirements for electronic devices. To meet multifunctional requirements for electronic devices, more antennas are disposed at the electronic devices. At present, in actual use, multiple antennas usually share a same radiator, which, however, easily leads to poor radiation performance of the multiple antennas.

SUMMARY

Embodiments of this application are intended to provide an electronic device.

An embodiment of this application provides an electronic device, including a first radiator, a second radiator, a first signal source, and a second signal source, where the first radiator is coupled to the second radiator, the first signal source is electrically connected to the first radiator, the second signal source is electrically connected to the second radiator, the first signal source is a signal source used when the electronic device works at a positioning frequency band or works at a first WiFi frequency band, and the second signal source is a signal source used when the electronic device works at a second WiFi frequency band.

In this embodiment of this application, a radiator corresponding to that the electronic device works at the positioning frequency band and works at the first WiFi frequency band is different from a radiator corresponding to that the electronic device works at the second WiFi frequency band. Therefore, radiation performance of the electronic device working at the positioning frequency band, the first WiFi frequency band, and the second WiFi frequency band can be enhanced simultaneously.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, "and/or" in the specification and claims represents at least one of connected objects. Symbol "I" in this specification generally represents an "or" relationship between associated objects.

With reference to the accompanying drawings, an electronic device provided in the embodiments of this application will be described in detail by using examples and application scenarios thereof.

Figure 1:
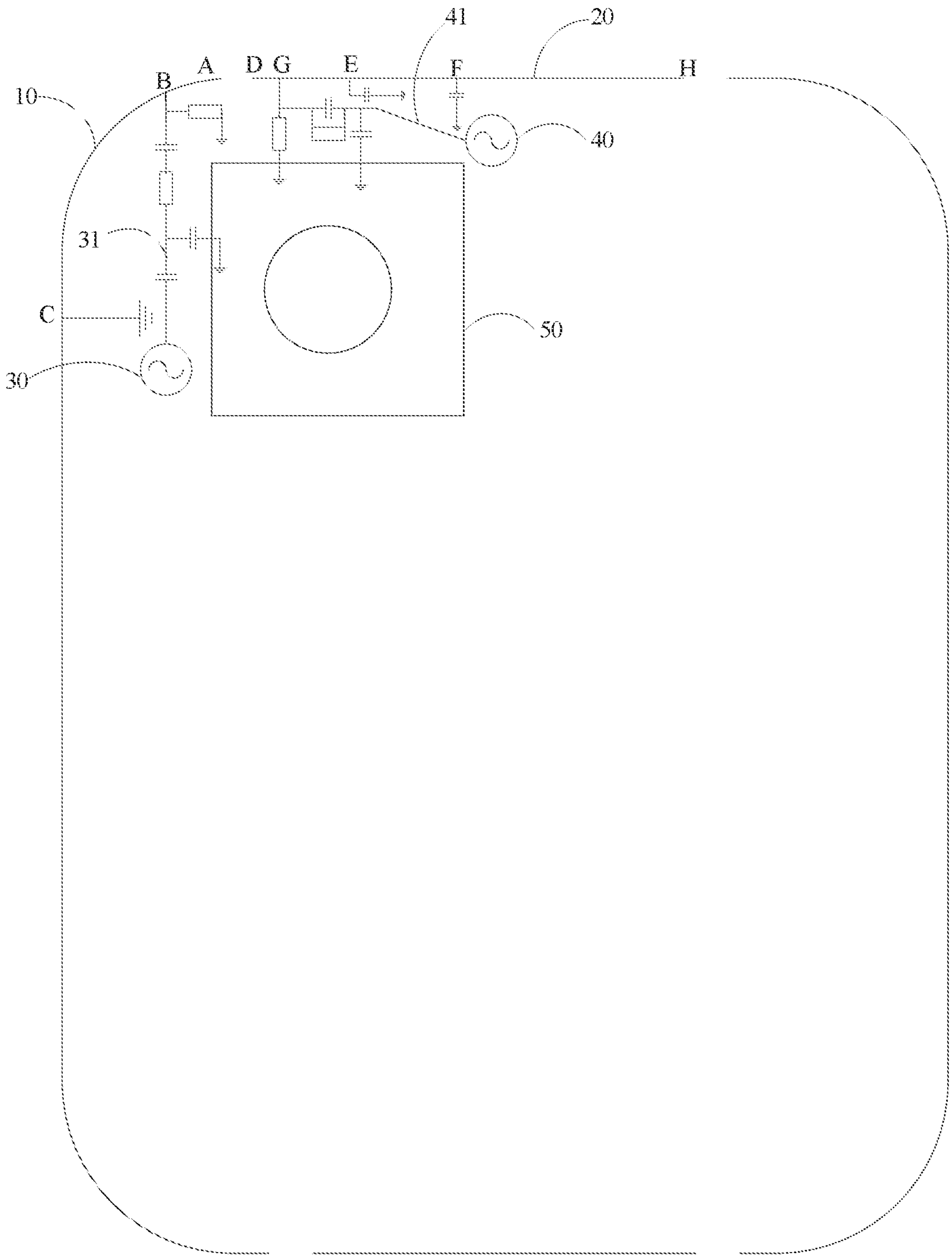
FIG. 1 is a first schematic structural diagram of an electronic device according to an embodiment of this application.

Referring to FIG. 1, FIG. 1 is a schematic structural diagram of an electronic device according to an embodiment of this application. As shown in FIG. 1, the electronic device includes a first radiator 10, a second radiator 20, a first signal source 30, and a second signal source 40. The first radiator 10 is coupled to the second radiator 20. The first signal source 30 is electrically connected to the first radiator 10. The second signal source 40 is electrically connected to the second radiator 20. The first signal source 30 is a signal source used when the electronic device works at a positioning frequency band and works at a first WiFi frequency band. The second signal source 40 is a signal source used when the electronic device works at a second WiFi frequency band.

For a working principle of this embodiment of this application, please refer to the following descriptions.

Because the first signal source 30 is the signal source used when the electronic device works at the positioning frequency band or works at the first WiFi frequency band, and the second signal source 40 is the signal source used when the electronic device works at the second WiFi frequency band, the first signal source 30 is electrically connected to the first radiator 10, and the second signal source 40 is electrically connected to the second radiator 20, a same radiator is not shared any more when the electronic device works at the second WiFi frequency band and when the electronic device works at the positioning frequency band or the first WiFi frequency band. That is, a corresponding signal and radiator source when the electronic device works at the second WiFi frequency band are disposed separately. Therefore, corresponding radiation performance when the electronic device works at the second WiFi frequency band is enhanced, and corresponding radiation performance when the electronic device works at the positioning frequency band or the first WiFi frequency band is also enhanced.

In addition, because the corresponding signal source and radiator are disposed separately when the electronic device works at the second WiFi frequency hand, the number of combiners in the electronic device is reduced, that is, a loss of a signal when passing through the combiner is reduced. Therefore, a loss of a printed circuit board during routing is optimized, and then radiation performance of the entire electronic device corresponding to WiFi is improved. In addition, compared with a manner in which multiple antennas share one radiator, a volume occupied by multiple antennas in the electronic device of this embodiment may be reduced, and then a volume of the entire electronic device can be reduced.

The first signal source 30 may be electrically connected to the first radiator 10 through a first impedance matching circuit 31, and the second signal source 40 may be electrically connected to the second radiator 20 through a second impedance matching circuit 41. The first impedance matching circuit 31 and the second impedance matching circuit 41 may each include components such as a capacitor and an inductor, and a manner in which the first impedance matching circuit 31 and the second impedance matching circuit 41 is disposed may be determined according to radiation performance of the first radiator 10 and the second radiator 20.

The first radiator 10 and the second radiator 20 may both be grounded. For example, the first radiator 10 may include a first end (such as point A in FIG. 1) and a third end (such as point C in FIG. 1). The first end is disposed close to the second radiator 20 relative to the third end, that is, a distance between the first end and the second radiator 20 is smaller than that between the third end and the second radiator 20, and the first radiator 10 may be grounded through the third end. The second radiator 20 may include a second end (such as point D in FIG. 1), a fourth end (such as point H in FIG. 1), a first grounding point (such as point E in FIG. 1) and a second grounding point (such as point F in FIG. 1), and the second radiator 20 may be grounded through at least one of the first grounding point or the second grounding point (see the following for detailed description).

In some embodiments, the first end of the first radiator 10 is disposed opposite to the second end of the second radiator 20, the third end of the first radiator 10 is grounded, and the first grounding point of the second radiator 20 is grounded.

The first signal source 30 is connected to a first connection point (such as point B in FIG. 1) of the first radiator 10 through the first impedance matching circuit 31, and the first connection point divides the first radiator 10 into a first sub-radiator and a second sub-radiator. An area between the first end and the first connection point forms the second sub-radiator, and an area between the first connection point and the third end forms the first sub-radiator.

The second signal source 40 is connected to a second connection point (such as point G in FIG. 1) of the second radiator 20 through the second impedance matching circuit 41, and the second connection point divides the second radiator 20 into a third sub-radiator and a fourth sub-radiator. An area between the second end and the second connection point forms the third sub-radiator, and an area between the second connection point and the first grounding point forms the fourth sub-radiator.

The first sub-radiator and the second sub-radiator work at the positioning frequency band. The second sub-radiator, the third sub-radiator, and the fourth sub-radiator work at the first WiFi frequency band. The fourth sub-radiator, the third sub-radiator, and the second sub-radiator work at the second WiFi frequency band.

The first sub-radiator and the second sub-radiator are electrically connected; and similarly, the third sub-radiator and the fourth sub-radiator are electrically connected.

In this implementation, because the first sub-radiator and the second sub-radiator work at the positioning frequency band; the second sub-radiator, the third sub-radiator, and the fourth sub-radiator work at the first WiFi frequency band; or the fourth sub-radiator, the third sub-radiator, and the second sub-radiator work at the second WiFi frequency band, a part of an area of the first radiator and the second radiator may be reused, so that a radiation aperture when the electronic device works at the positioning frequency band, the first WiFi frequency band, and the second WiFi frequency band is prolonged, and then radiation efficiency is improved.

Referring to FIG. 1, the second sub-radiator may be section BA in FIG. 1, the first sub-radiator may be section BC in FIG. 1, the third sub-radiator may be section DG in FIG. 1, and the fourth sub-radiator may be section GE in FIG. 1.

Specific values of a frequency corresponding to the first WiFi frequency band and a frequency corresponding to the second WiFi frequency band are not limited herein. As an implementation, the frequency corresponding to the second WiFi frequency band is lower than or equal to the frequency corresponding to the first WiFi frequency band.

As another implementation, the frequency corresponding to the second WiFi frequency band is higher than the frequency corresponding to the first WiFi frequency band.

For example, the frequency corresponding to the second WiFi frequency band may be 5,150 MHz-5,850 MHz, the frequency corresponding to the first WiFi frequency band may be 2,400 MHz-2,500 MHz, and a frequency corresponding to a positioning system may be 1,550 MHz-1,650 MHz.

In this implementation, because the frequency corresponding to the second WiFi frequency band is higher than that corresponding to the first WiFi frequency band, a signal source and a radiator is disposed separately at the second WiFi frequency band with a relatively great frequency. Therefore, relatively good radiation performance of the radiator can be further ensured, and the influence of other components on the radiation performance can be reduced.

In addition, that the first sub-radiator and the second sub-radiator work at the positioning frequency band may also be understood as follows: the first sub-radiator and the second sub-radiator form an inverted F antenna (IFA) mode;

that the second sub-radiator, the third sub-radiator, and the fourth sub-radiator work at the first WiFi frequency band may also be understood as follows: the second sub-radiator, the third sub-radiator, and the fourth sub-radiator form a dipole mode; and that the fourth sub-radiator, the third sub-radiator, and the second sub-radiator work at the second WiFi frequency band may also be understood as follows: the fourth sub-radiator and the third sub-radiator form the WA mode, while the third sub-radiator and the second sub-radiator form the dipole mode.

As an implementation, the fourth sub-radiator and the third sub-radiator form the IFA mode, while the third sub-radiator and the second sub-radiator form the dipole mode may also be understood in the following implementation:

the third sub-radiator and the fourth sub-radiator are used as a first target radiator, the third sub-radiator and the second sub-radiator are used as a second target radiator of the electronic device, and the first target radiator and the second target radiator work at the second WiFi frequency band.

This way, a radiation aperture when the electronic device works at the second WiFi frequency band can be increased, the radiation performance can be improved, and diversity of radiation manners when the electronic device works at the second Win frequency band can be enhanced.

Figure 2:
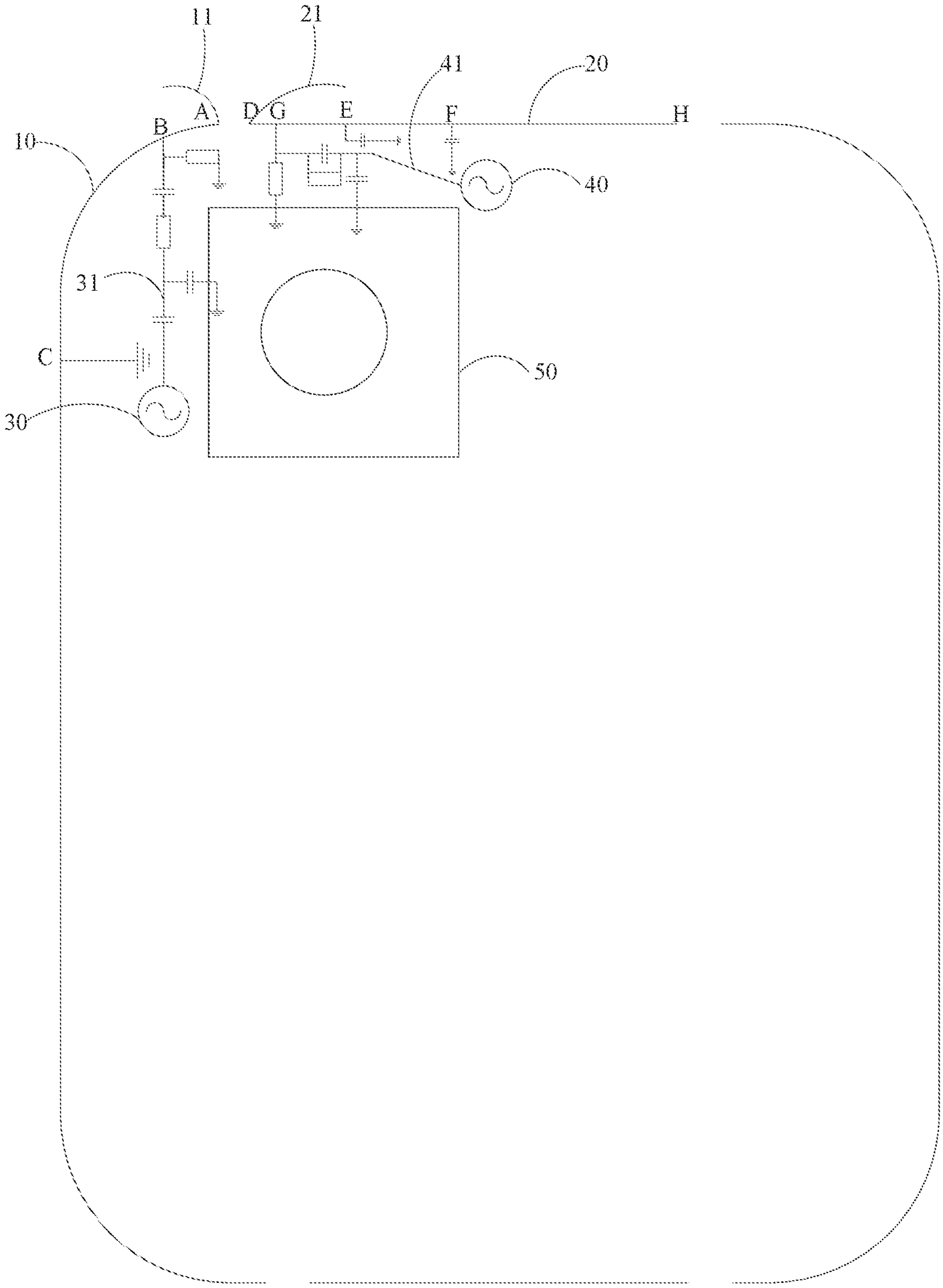
FIG. 2 is a second schematic structural diagram of the electronic device according to an embodiment of this application.
Figure 3:
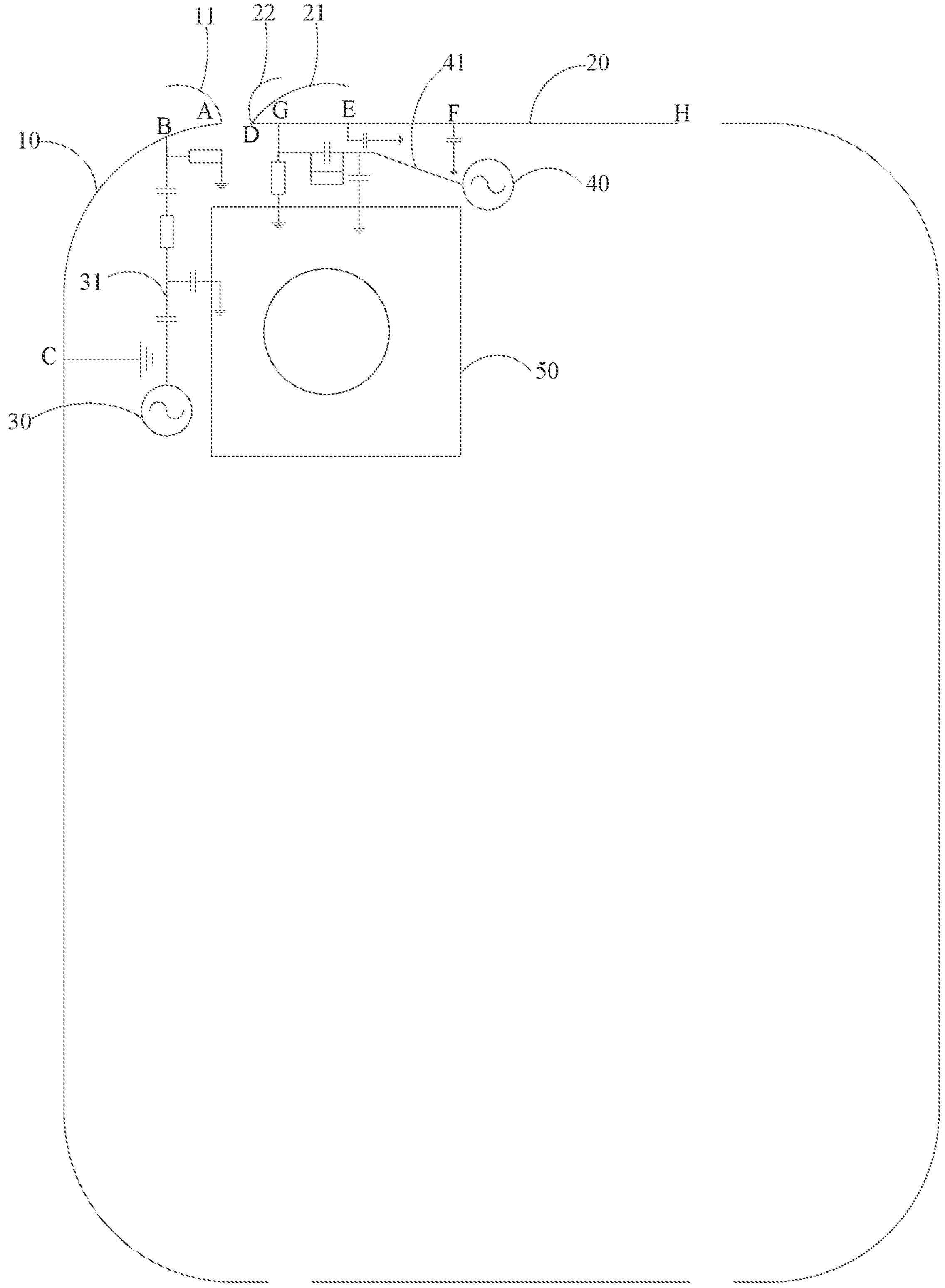
FIG. 3 is a third schematic structural diagram of the electronic device according to an embodiment of this application.
Figure 4:
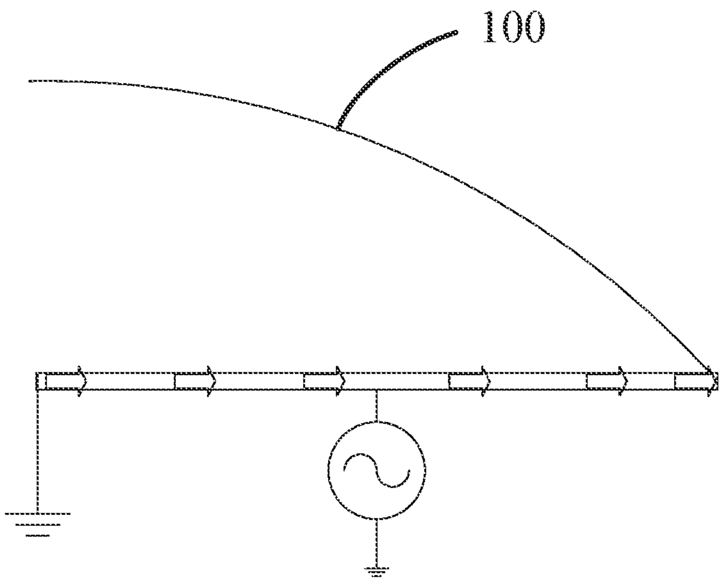
FIG. 4 is a first current distribution diagram of an antenna of an electronic device according to an embodiment of this application.

It should be noted that when the electronic device works at the first WiFi frequency band, a curve 11 and a curve 21 in FIG. 2 and FIG. 3 respectively show current distribution in the second sub-radiator, and current distribution in the third sub-radiator and the fourth sub-radiator. When the electronic device works at the second WiFi frequency band, as shown in FIG. 3, the second sub-radiator and the third sub-radiator also form the dipole mode, that is, a current included in dipole mode is a current distributed on the curve 11 and a curve 22, while a current included in IFA mode formed by the third sub-radiator and the fourth sub-radiator is a current distributed shown on the curve 21.

An embodiment is illustrated for description as follows:

Referring to FIG. 4 to FIG. 7, 100 in FIG. 4 to FIG. 7 each indicates current distribution in different modes, and a direction of an arrow indicates a direction of a current. As a distance between a position on the curve shown by 100 and a radiator (that is, a component where the arrow is located) is greater, the current intensity at the position is greater.

Figure 5:
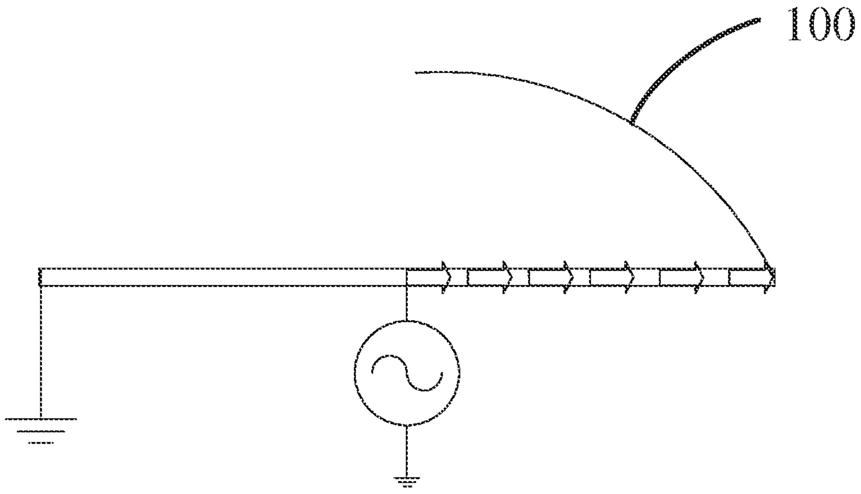
FIG. 5 is a second current distribution diagram of the antenna of the electronic device according to an embodiment of this application.
Figure 6:
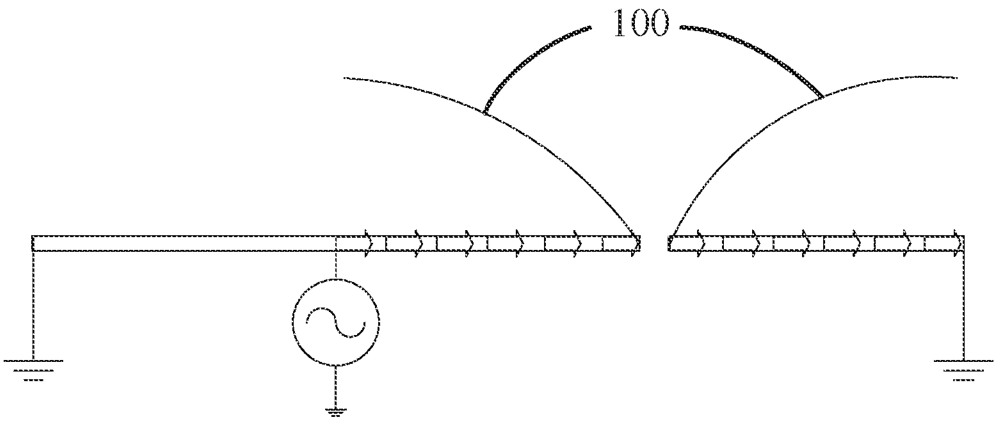
FIG. 6 is a third current distribution diagram of the antenna of the electronic device according to an embodiment of this application.
Figure 7:
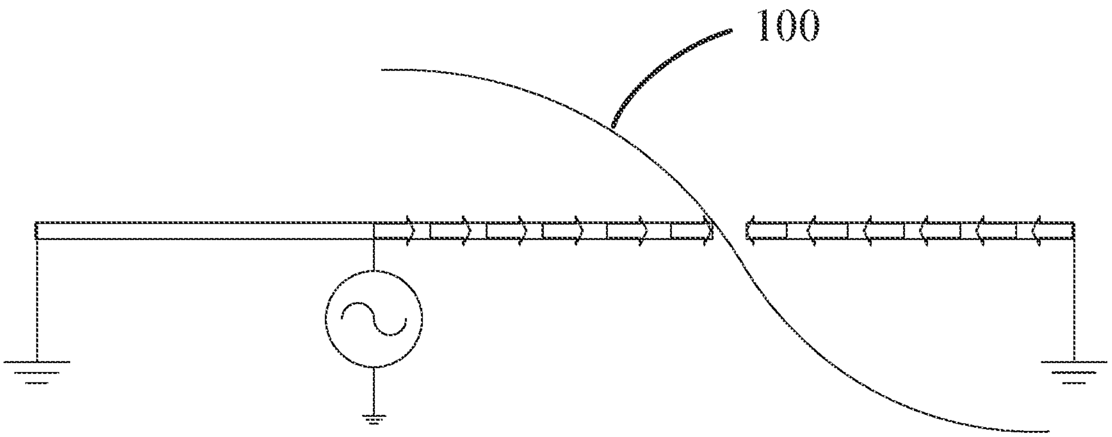
FIG. 7 is a fourth current distribution diagram of the antenna of the electronic device according to an embodiment of this application.

In addition, a current distribution diagram shown in HQ. 4 is a current distribution diagram in IFA mode; a current distribution diagram shown in FIG. 5 is a current distribution diagram in monopole mode; a current distribution diagram shown in FIG. 6 is a current distribution diagram in dipole mode or half-wave mode; and a current distribution diagram shown in FIG. 7 is a current distribution diagram in loop mode.

In addition, because the first radiator 10 is coupled to the second radiator 20, even if a human body contacts one of the first radiator 10 or the second radiator 20, the radiation performance of the other radiator will not be affected, so that radiation performance of the other radiator can be normally ensured. It should be noted that when the electronic device, in game mode, accesses a network through WiFi, a user contacts one of the first radiator 10 or the second radiator 20, which can ensure that a network access speed of the electronic device declines slowly, that is, a speed of a player, also called WiFi, drops slowly.

In some embodiments, referring to FIG. 2, corresponding currents in the second sub-radiator and the third sub-radiator are in a same direction. This way, it can be ensured that the second sub-radiator and the third sub-radiator form the dipole mode, so that an effect of coupling between the second sub-radiator and the third sub-radiator is better, and then radiation performance of the second sub-radiator and the third sub-radiator is further enhanced.

A flow direction of a first current in the second sub-radiator is represented by the curve 11 in FIG. 2, and a flow direction of a second current in the third sub-radiator and the fourth sub-radiator is represented by the curve 21 in FIG. 2. It should be noted that for currents flowing in a same direction, please refer to the following description: a coordinate system is established by taking a direction of a first connection line between AD as an X axis and a direction of a second connection line perpendicular to the first connection line as a Y axis, and because the first current corresponding to the curve 11 and the second current corresponding to the curve 21 both correspond to a positive half axis of the Y axis, it can be said that the first current corresponding to the curve 11 and the second current corresponding to the curve 21 flow in the same direction. Correspondingly, if one of the first current corresponding to the curve 11 or the second current corresponding to the curve 21 corresponds to the positive half axis of the Y axis and the other corresponds to a negative half axis of the Y axis, it can be said that the first current corresponding to the curve 11 and the second current corresponding to the curve 21 flow in opposite directions.

In some embodiments, in a case that the frequencies in the second WiFi frequency band are higher than the frequencies in the first WiFi frequency band, the second radiator 20 is a radiator of a Near Field Communication (NFC) antenna, and a first grounding point of the second radiator 20 is grounded through a first capacitor, the first grounding point is located between the second connection point and the fourth end of the second radiator 20, and the fourth end and the second end are two ends of the second radiator. This way, when the electronic device works at the second WiFi frequency band, a radiator may be shared with the NFC. Therefore, the number of radiators and weight of the entire electronic device may be reduced. In addition, the first grounding point of the second radiator 20 is grounded through the first capacitor, so that the influence on radiation performance of the NFC is small.

The first grounding point may be one end point of the first target radiator formed by the third sub-radiator and the fourth sub-radiator, and the other end point is the second end of the second radiator 20.

As an implementation, a frequency of the NFC is generally 13.56 MHz, and a corresponding radiator is relatively long; but the frequency corresponding to the second WiFi frequency band may be 5,150 MHz-5,850 MHz, and therefore the frequency corresponding to the second WiFi frequency band is higher than the frequency of the NFC, that is, the frequency of the NFC is a low frequency relative to the frequency corresponding to the second WiFi frequency band. A capacitance value of the first capacitor may be 33 pF-100 pF, and the first capacitor plays a role in making a high frequency pass and blocking a low frequency. Therefore, the first capacitor is in an open circuit state for a radiator of the NFC, which does not affect normal radiation performance of the radiator of the NFC, that is, has little influence on the radiation performance of the radiator of the NEC.

As an implementation, the second radiator 20 further includes a second grounding point, and the second grounding point is located between the first grounding point and the fourth end, and the second grounding point is grounded through a second capacitor. This way, the influence on the radiation performance of the NEC can be further reduced.

A position of the second grounding point is related to the radiation performance of the NEC, and the position of the second grounding point may be adjusted according to a degree of the influence on the NFC. For example, when the radiation performance of the NEC is greatly affected, the second grounding point may be disposed far away from the first grounding point and close to the fourth end; and when the influence on the radiation performance of the NFC is seldom affected, the second grounding point may be disposed close to the first grounding point and far away from the fourth end.

The second end may be point D in FIG. 1, the fourth end may be point H in FIG. 1, the first grounding point may be point E in FIG. 1, and the second grounding point may be point F in FIG. 1.

In this implementation, because the first grounding point and the second grounding point are grounded through the first capacitor and the second capacitor respectively, the influence on the radiation performance of the NFC antenna may be further reduced.

As another implementation, at least one of the second end or the fourth end may also be grounded through a capacitor, so that the influence on the radiation performance of the NFC antenna may also be reduced, and a connection point may be disposed at a position more flexibly.

Positions for disposing the first radiator 10 and the second radiator 20 are not particularly limited herein. As an implementation, the first radiator 10 and the second radiator 20 may be located in an accommodating cavity included in a housing of the electronic device. As another implementation, the first radiator 10 and the second radiator 20 may be located on the housing of the electronic device.

In addition, as still another implementation, the first radiator 10 and the second radiator 20 form a part of the housing of the electronic device. This way, because the first radiator 10 and the second radiator 20 form a part of the housing, the influence of other components in the housing of the electronic device on the radiation performance of the first radiator 10 and the second radiator 20 may be reduced, and the weight of the entire electronic device may be reduced.

In some embodiments, a gap exists between the first radiator 10 and the second radiator 20, and the gap is located at the top of the housing of the electronic device.

A width of the gap is not limited herein. The top of the housing of the electronic device may be an end where a camera module, a receiver, a position sensor, and other components are disposed.

This way, because the gap is at the top, and the gap may be called an opening of a positioning system, it can be ensured that a radiation direction of the positioning system is consistent with a direction of maximum radiation of an antenna of the electronic device, thus ensuring that an upper hemisphere occupies a high proportion, and a great effective clearance can be ensured, and radiation efficiency of a first signal corresponding to the positioning system can be improved, further improving efficiency of the upper hemisphere.

As an implementation, the first radiator 10 and the second radiator 20 are fixedly connected through an insulator.

A material of the insulator is not specifically limited herein. For example, the insulator may be made of plastic or rubber.

In addition, the insulator may be disposed in the gap, the insulator may completely fill the gap, or the insulator may fill only a part of the gap. This is not specifically limited herein.

In this implementation, because the first radiator 10 and the second radiator 20 are fixedly connected through the insulator, insulation performance of the first radiator 10 and the second radiator 20 can be ensured, and strength of connection between the first radiator 10 and the second radiator 20 can be enhanced, thus enhancing stability of the housing. In addition, an effect of coupling between the first radiator 10 and the second radiator 20 can be enhanced, and the radiation performance of the antenna of the electronic device can be enhanced.

As an implementation, the first radiator 10 is located at a first corner position or a second corner position of a housing of the electronic device, the second radiator 20 is located between the first corner position and the second corner position, and the first corner position and the second corner position are disposed opposite to each other.

The first corner position and the second corner position may be an upper left corner position and an upper right corner position of a rectangular housing respectively, or an upper left corner position and a lower left, coiner position, or may also be an upper right corner position and a lower right corner position, or a lower left corner position and a lower right corner position. This is not specifically limited herein.

This way, because the second radiator 20 may be located between the first corner position and the second corner position, a clearance corresponding to the second radiator 20 may be relatively great, interference of other components with the radiation performance of the second radiator 20 may be reduced, and the radiation performance of the second radiator 20 may be enhanced.

The embodiments of this application are described with reference to the accompanying drawings. However, this application is not limited to the foregoing implementations. The foregoing implementations are merely examples, but are not limiting. Under enlightenment of this application, a person of ordinary skill in the art may make many forms without departing from the objective and the scope of the claims of this application, and these forms all fall within the protection scope of this application.

The invention claimed is:

1. An electronic device, comprising:

a first radiator;

a second radiator;

a first signal source; and a second signal source, wherein the first radiator is coupled to the second radiator, the first signal source is electrically connected to the first radiator, the second signal source is electrically connected to the second radiator, the first signal source is a signal source used when the electronic device works at a positioning frequency band or works at a first WiFi frequency band, and the second signal source is a signal source used when the electronic device works at a second WiFi frequency band, wherein a first end of the first radiator is disposed opposite to a second end of the second radiator, a third end of the first radiator is grounded, and a first grounding point of the second radiator is grounded, wherein the first signal source is connected to a first connection point of the first radiator through a first impedance matching circuit, wherein the first connection point divides the first radiator into a first sub-radiator and a second sub-radiator, an area between the first end and the first connection point form the second sub-radiator, and an area between the first connection point and the third end form the first sub-radiator, wherein the second signal source is connected to a second connection point of the second radiator through a second impedance matching circuit, wherein the second connection point divides the second radiator into a third sub-radiator and a fourth sub-radiator, an area between the second end and the second connection point form the third sub-radiator, and an area between the second connection point and the first grounding point form the fourth sub-radiator, wherein the first sub-radiator and the second sub-radiator work at the positioning frequency band, and wherein the second sub-radiator, the third sub-radiator, and the fourth sub-radiator work at the first WiFi frequency band, or wherein the second sub-radiator, the third sub-radiator, and the fourth sub-radiator work at the second WiFi frequency band.

2. The electronic device according to claim 1, wherein frequencies in the second WiFi frequency band are higher than frequencies in the first WiFi frequency band.

3. The electronic device according to claim 1, wherein corresponding currents in the second sub-radiator and the third sub-radiator are in a same direction.

4. The electronic device according to claim 1, wherein when frequencies in the second WiFi frequency band are higher than frequencies in the first WiFi frequency band, the second radiator is a radiator of a near-field communication NFC antenna, the first grounding point is grounded through a first capacitor, the first grounding point is located between the second connection point and a fourth end of the second radiator, and the fourth end and the second end are two ends of the second radiator.

5. The electronic device according to claim 4, wherein the second radiator further comprises a second grounding point, and the second grounding point is located between the first grounding point and the fourth end, and the second grounding point is grounded through a second capacitor.

6. The electronic device according to claim 1, wherein the third sub-radiator and the fourth sub-radiator are used as a first target radiator, the third sub-radiator and the second sub-radiator are used as a second target radiator of the electronic device, and the first target radiator and the second target radiator work at the second WiFi frequency band.

7. The electronic device according to claim 1, wherein the first radiator and the second radiator form a part of a housing of the electronic device.

8. The electronic device according to claim 1, wherein the first radiator and the second radiator are fixedly connected through an insulator.

9. The electronic device according to claim 1, wherein the first radiator is located at a first corner position or a second corner position of a housing of the electronic device, the second radiator is located between the first corner position and the second corner position, wherein the first corner position and the second corner position are disposed opposite to each other.

* * * * *